United States Patent

De Varda

[15] 3,666,653
[45] May 30, 1972

[54] CRYOLITIC LININGS IN FURNACES FOR ALUMINUM SMELTING

[72] Inventor: Giuseppe De Varda, Milan, Italy
[73] Assignee: Montecatini Edison S.p.A., Milan, Italy
[22] Filed: July 6, 1967
[21] Appl. No.: 652,998

[30] Foreign Application Priority Data

July 6, 1966  Italy......................15623/66

[52] U.S. Cl. ...........................204/243 R, 204/294
[51] Int. Cl. ...........................C22d 3/02, B01k 3/08
[58] Field of Search ...........................204/243–247, 67, 204/294

[56] References Cited

UNITED STATES PATENTS

| | | | |
|---|---|---|---|
| 1,534,322 | 4/1925 | Hoopes et al. | 204/67 |
| 2,398,590 | 4/1946 | Mitchell | 204/243 X |
| 2,526,875 | 10/1950 | Jouannet | 204/67 |
| 3,457,149 | 7/1969 | Johnson | 204/243 X |
| 3,457,158 | 7/1969 | Bullough | 204/243 |

Primary Examiner—Howard S. Williams
Assistant Examiner—D. R. Valentine
Attorney—Curt M. Avery, Arthur E. Wilfond, Herbert L. Lerner and Daniel J. Tick

[57] ABSTRACT

Disclosed is an improvement in furnace vats for fused bath electrolysis of alumina which comprises a refractory mass of substantially pure natural or synthetic cryolite or of cryolite-alumina mixtures in which a dispersion of carbon grit is within the refractory mass. Also disclosed is a process for preparing said mass.

5 Claims, 1 Drawing Figure

Patented May 30, 1972 3,666,653
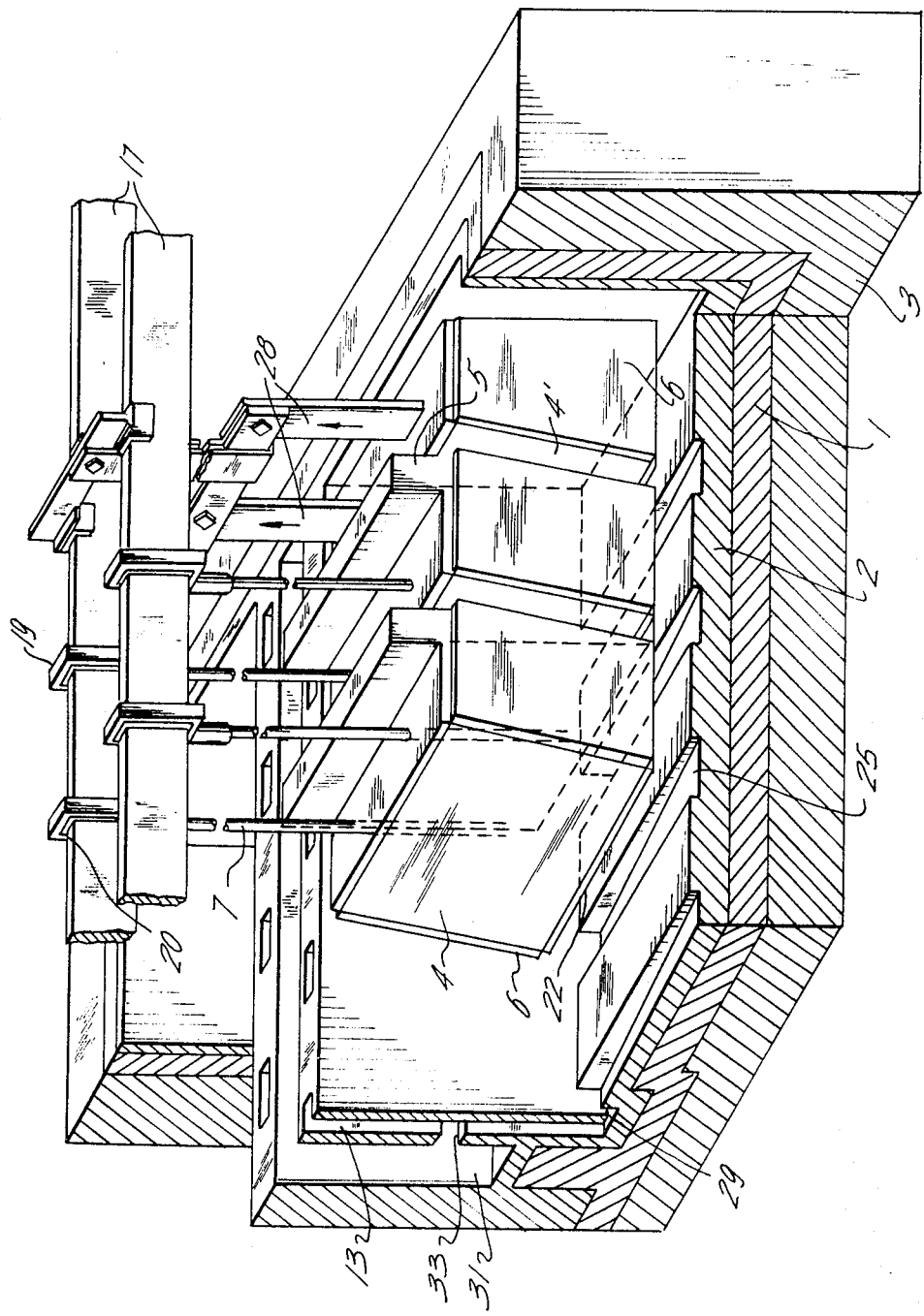

CRYOLITIC LININGS IN FURNACES FOR ALUMINUM SMELTING

The present invention relates to an improvement to internal refractory lining for containing the molten electrolytic bath and the metal in furnaces for aluminum smelting by fused bath electrolysis of alumina in cryolite. More particularly, the present invention relates to an improved cryolitic vat in furnaces for aluminum production.

Some materials consisting of mixture of alumina and cryolite, containing at least 20 percent and preferably more than 40 percent of alumina have been proposed recently (see U.S. Pat. Nos. 3,093,570; 3,261,699; 3,267,183 and French Pat. No. 1,353,565) for lining the bottom and/or the walls of traditional furnaces for alumina reduction, in order to avoid the well known shortcomings of carbon-lined pots (rapid spoiling of side walls, swellings, deformations and heaving of the bottom and so on).

Furthermore in my copending application filed concurrently herewith and based on the same priority document, a refractory material consisting of practically pure cryolite (natural or synthetic) has been proposed for lining the bottom and/or the walls of either traditional or multicell furnaces, which affords certain advantages with respect to the above-mentioned mixture of alumina and cryolite. The pertinent portions of this application are incorporated by reference.

The instant invention considerably improves the properties of the above-mentioned refractory materials of either cryolite-alumina mixture and cryolite alone, for the construction of such furnace vats.

The invention has particular importance in the construction of multicell furnaces, where, because of the use of bipolar electrodes, the side walls should be much higher than in traditional furnaces.

I have found that if a certain percentage of carbon grit is incorporated (more or less dispersed) in the refractory mass of cryolite or of cryolite alumina mixture, the properties of said refractory material are improved, so as to make them more suitable for the construction of internal vats in furnaces both monocell and multicell for aluminum smelting. In particular, I have surprisingly found that the stability of big-shaped vertical walls can be substantially improved through the present invention, not only with walls made of cryolite alone, but furthermore that this is true also with walls of cryolite-alumina mixtures, which otherwise would not be suitable for those constructions.

The drawing shows a typical multicell aluminum furnace. The particular furnace is of the necklace type.

The structural details of this furnace can be found in U.S. Pat. No. 3,178,363. The furnace hereof corresponds to that shown in FIG. 6 of said U.S. Pat. No. 3,178,363, the pertinent portions of which are incorporated by reference.

The vat 1 containing the bath is made of carbonaceous material and is lined on its entire inner surface by refractory layer 2. The vat 1 is protected on the outside by an insulating jacket 3, providing thermal insulation. The bipolar electrodes 4 are rigidly suspended from supporting bars 7 fastened to longitudinal beams 17. The bars are fastened to the beams 17 by collars 19. Each bar 7 is electrically insulated from its suspension beam by an insulator 20. The beams 17 are also electrically insulated from the remainder of the furnace by insulators (not shown). The current-supply connecting bars 28 of the necklace furnace serve also to suspend monopolar electrodes 4'. The consumable anode portion 5 of each electrode is fed from the top through a stack, not shown in the drawing. Both the bipolar electrodes 4 and the terminal monopolar electrodes 4' are framed with a protective refractory coating that is inert both to the bath and to the electrolysis. The refractory frame comprises the side coatings 6, the base coatings 22 and the top coatings 43.

The central longitudinal refractory wall 12 is provided with vertical pockets 13 for reception of the metal produced. The metal produced in any one of the cells is conveyed to the corresponding pocket 13 through individual grooves 25, suitably dimensioned and arranged on the vat bottom to take account of the bath circulation and preferably having an inclined bottom. The pockets 13 are connected through a conduit 29 with the groove 25 of the inclined bottom. An overflow weir 33 serves to let the molten aluminum overflow into a receptacle 31 common to each series of cells.

The term "carbon grit" is intended herein to indicate any carbonaceous material having granules of any size, for instance metallurgical coke grit as used in the start-off of traditional furnaces as a layer acting as a heating resistor between the anode and cathode. In the drawing, the refractory layer is constituted by the material according to the invention, namely by cryolite, or cryolite-alumina mixture, containing carbon grit, and is indicated by reference numeral 2 and may be in the form of prefabricated shaped pieces.

To prepare said shaped pieces according to the present invention, it is sufficient to fill an empty mold (of carbon, silicon nitride-bonded silicon carbide such as sold under the trade name "Refrax" by Carborundum, metal or other suitable material) of the desired shape with carbonaceous grit having the desired quality, size and characteristics. (The correct selection of such parameters is obvious for one skilled in the art; for instance, said selection will be based on the electrical conductivity, according to whether it is required or not by the furnace type involved.)

The carbon grit may be mixed, if necessary, with a certain percentage of solid cryolite and/or alumina, preferably preheated at a temperature in excess of 900° C. Molten and substantially pure cryolite or molten cryolite having a high alumina content (10–20 percent by weight of alumina $Al_2O_3$ and more) is then poured into said mold. Said molten material will fill the free interstices in the carbon grit.

The process for preparing the materials according to the present invention may be varied further. For instance, to obtain a more economical material, the mold or form can be filled not only with carbonaceous grit and alumina, but also with a solid cryolite bath containing a large percentage of alumina dissolved therein, so that the mixture resulting in the form after pouring contains the sufficiently high percentage of alumina. The pouring can be further facilitated by subjecting the form to vacuum.

The danger of the formation of nodules impermeable to the further flow of the molten cryolite in the form, between the solid particles filling said form, is thus avoided.

The vat or the shaped pieces (for instance bricks and plates) or the vat parts thus cast, can be easily welded with one another by merely heating the vat once the individual pieces have been assembled. The welding in situ of the above-mentioned bricks or plates can be made easier by spreading into the welding joints a thin layer of powdered or molten cryolitic material.

Joints are thus obviated (always being weak points in any constructions) by simple adhesion of the individual pieces to the adjacent ones when hot. If such treatment should not immediately provide a perfect weld, one need do nothing else but wait for the subsequent cautious start of the furnace, for the final elimination of those joints.

Said vats, once assembled in situ, can be easily completed towards the outside, with the usual refractory and heat-insulating material, obtaining the welding with the external layers by a layer of rammed carbonaceous paste. In many cases, however, these refractory and heat-insulating materials are superfluous and the external metal vat only (pot shell) suffices.

The hereinbefore described prefabricated cryolite materials have high melting points and are not subject to chemical or electrochemical attacks by the bath. However, materials with pure cryolite are preferred over those with alumina content.

The invention has been disclosed in an embodiment with the use of prefabricated shaped cryolitic pieces. Of course, the scope of the invention is not restricted to such embodiment but also includes its variants and equivalents. For instance, a further method for constructing a furnace vat according to the present invention is to introduce into the metal shell, which may be lined with a heat-insulating material and which constitutes the outer part of the furnace pot, a shaped body (e.g., of carbon) so as to leave a clear space between said body and the inner walls and/or bottom of said lined shell. Then molten cryolite or cryolite-alumina mixture, containing carbon grit dispersed therein, is poured into said clear space to fill it. The cryolitic material is allowed to solidify, whereafter the said body is removed.

The term cryolite as used in the appended claims refers to natural or synthetic cryolite or cryolite-alumina mixtures.

I claim:

1. In a furnace vat made of a refractory mass constituted of cryolite, for containing the molten electrolytic bath and aluminum in monocell or multicell furnaces for fused bath electrolysis for aluminum production, the improvement which comprises a dispersion of carbon grit within the cryolitic refractory mass.

2. The furnace vat of claim 1, wherein said vat is composed of at least one prefabricated shaped piece.

3. The furnace vat of claim 2, wherein the prefabricated shaped pieces consist of substantially pure cryolite containing carbon grit in dispersion.

4. The furnace vat of claim 2, wherein the prefabricated shaped pieces consist of cryolite-alumina mixtures, containing carbon grit in dispersion.

5. The furnace vat of claim 4, wherein the prefabricated shaped pieces consist of mixtures cryolite-alumina containing at least about 20 percent of $Al_2O_3$.

* * * * *